United States Patent [19]

Bloch et al.

[11] Patent Number: 4,506,332

[45] Date of Patent: Mar. 19, 1985

[54] FACILITY FOR MONITORING THE LEVEL OF A RADIO-FREQUENCY SIGNAL

[75] Inventors: Samuel Bloch, Stuttgart; Klaus Bressler, Ditzingen; Horst Idler, Stuttgart; Herbert Kleiber, Ludwigsburg, all of Fed. Rep. of Germany

[73] Assignee: International Standard Electric Corporation, New York, N.Y.

[21] Appl. No.: 343,491

[22] Filed: Jan. 28, 1982

[30] Foreign Application Priority Data

Jan. 30, 1981 [DE] Fed. Rep. of Germany ....... 3103118

[51] Int. Cl.³ .............................................. G01R 19/00
[52] U.S. Cl. .................................... 364/483; 364/481; 455/226; 343/17.7; 343/351
[58] Field of Search ............... 364/480, 481, 483, 517; 307/264, 493; 328/168, 175; 455/67, 155, 226; 330/279, 129; 343/17.7, 351, 360; 250/250

[56] References Cited

U.S. PATENT DOCUMENTS 4,186,351 1/1980 Brefini et al. ....................... 455/226
4,263,653 4/1981 Mecklenburg ...................... 364/483
4,347,515 8/1982 Hoover, Jr. ........................ 343/351

*Primary Examiner*—Gary Chin
*Assistant Examiner*—Edward R. Cosimano
*Attorney, Agent, or Firm*—T. L. Peterson; J. S. Christopher

[57] ABSTRACT

A system for monitoring the level of an RF signal having such a small amplitude that it must be amplified before it can be monitored. To determine the deviation of the amplifier gain from the desired value, an additional RF signal of relatively high amplitude is used and is attenuated by a predetermined amount before being applied to the amplifier. The levels of the attenuated and subsequently amplified RF signal are compared with the level of the unchanged signal. From the deviation of this ratio, the gain variation is determined.

Alternatively, in lieu of gain control of the amplifier the gain variation may be mathematically offset in the digital instrumentation provided.

The monitoring system is suitable for use in the so-called instrument-landing system (ILS) and in VOR and DVOR en-route navigation systems.

7 Claims, 1 Drawing Figure

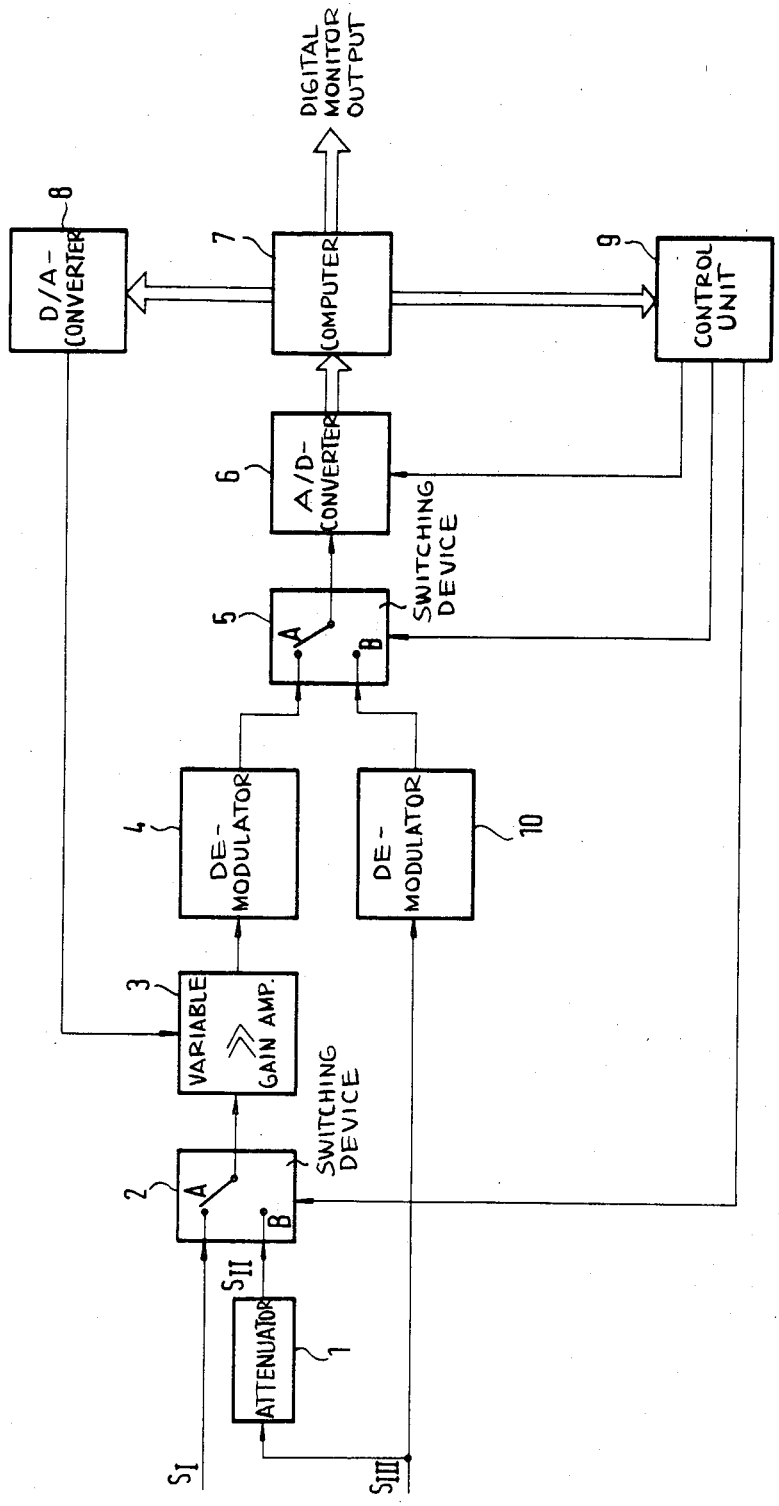

FACILITY FOR MONITORING THE LEVEL OF A RADIO-FREQUENCY SIGNAL

BACKGROUND OF THE INVENTION

1. Field of the Invention

The present invention relates to a facility for monitoring a low level radio-frequency signal, particularly in radio navigation equipment such as the widely used ILS (Instrument Landing System).

2. Description of the Prior Art

A facility of the kind to which the invention applies is described in an article by H-Rausch, "Moderne Funk-Landesysteme", Elektronik-Anzeiger, 6th Year, 1974, No. 11, pp. 223 to 227.

A monitoring facility forms part of the monitoring system described in the aforementioned references, the monitor being intended for an instrument-landing system (ILS). The signals to be monitored (if picked up, for example, by monitoring dipoles located at a distance of 100 m from the transmitter) may have such a small amplitude that they must be amplified prior to evaluation. To permit correct monitoring, an amplifier is needed which maintains the required gain stability over a long period and is substantially independent of temperature. Such amplifiers are complicated and susceptible to malfunction.

SUMMARY OF THE INVENTION

The general object of the invention may be said to be to provide a facility for monitoring the level of a radio-frequency signal wherein the monitoring accuracy is not dependent on gain variations.

Gain variations and aging effects of the amplifier used in the monitoring facility are compensated in the apparatus of the invention. Besides level measuring, other parameters of the signal to be monitored (e.g., any existing modulation) can be evaluated. Commercially available RF amplifier components can be used within the novel combination.

If, in addition to the low-level signal, there is also a signal is to be monitored whose level is so high that no amplification is required prior to evaluation, that high level signal can be used to determine any change in the gain of the amplifier.

BRIEF DESCRIPTION OF THE DRAWING

A single FIGURE is presented depicting a schematic block diagram of the combination according to the invention.

DETAILED DESCRIPTION OF THE PREFERRED EMBODIMENT

A preferred embodiment of the invention will now be explained in greater detail with reference to the aforementioned accompanying single drawing.

The signal to be monitored, $S_I$, is applied to a variable-gain amplifier 3 via a switching device 2. The amplifier output signal is demodulated in a demodulator 4 and transferred via a second switching device 5 (PIN-diode switch, for example) and an analog-to-digital converter 6 to a computer 7, which determines the level of the amplified, demodulated signal from the digital values fed to it. The output of A/D converter 6 is a parallel code digital word.

To hold the gain of the amplifier 3 constant, the monitoring facility is fed with an additional signal, $S_{III}$, whose amplitude is so large that no amplification of this signal is necessary for monitoring.

This signal is applied to an additional demodulator 10 and, when the second switching device 5 (PIN-diode switch) is in its "B" switch position, to the analog-to-digital converter 6. The level of the demodulated signal is determined and stored in the computer 7.

The additional signal $S_{III}$ is also applied to an attenuator 1 which produces an amount of attenuation (in decibels) equal to the amount of the decibel gain of the amplifier 3. The attenuated signal $S_{II}$ is applied to the first switching device 2. When this switching device 2 is in its "B" switch position, the signal $S_{II}$ will be amplified and evaluated instead of the signal to be monitored, $S_I$.

Depending on the control of the switching devices 2, 5, the levels of the following signals are determined in the receiver:

|  | Position | Position | Position |
| --- | --- | --- | --- |
| Switching device 2 | A | A | B |
| Switching device 5 | A | B | A |
| Evaluated Signal | $S_I$ | $S_{III}$ | $S_{II}$ |

The computer 7 is readily instrumented by those of skill in digital instrumentation. As one example of circuits which can be included are a pair of registers clocked to record the digitized values of the time shared signals from switching device 5 and a subtractor responsive to the two register values to give the feedback (gain control) signal to amplifier 3. The signal to be monitored may then have its amplitude digitally measured in computer 7 by other conventional circuits. The master programming signal to control unit 9 may likewise be conventionally generated.

Since the attenuator 1 can be constructed to provide highly stable attenuation, any change in the attenuation of the attenuator 1 with temperature or due to aging is negligible. If the computer 7 determines different levels for the demodulated signals $S_{II}$ and $S_{III}$, this will have been caused by a variation in the gain of the amplifier 3. Therefore, the measured levels are stored and compared in computer 7, and from the deviation of the level of the demodulated signal $S_{II}$ from the level of the demodulated signal $S_{III}$, a control signal is derived which adjusts the amplifier 3 so that level equality is obtained. The parallel word digital control signal provided by the computer is applied to digital-to-analog converter 8 and the resulting analog control signal thereby developed is applied as a gain control function to the amplifier 3.

If the attenuation provided by the attenuator 1 is not numerically equal to the gain of the amplifier 3, the levels of the demodulated signals $S_{II}$ and $S_{III}$ must have some other fixed relationship to each other. In that case, the control signal may be derived from the deviation of the ratio from the desired value.

As a variation, in lieu of controlling the gain of the amplifier 3, it is possible to allow for the deviation from the desired gain mathematically in the computer 7 during the evaluation of the signal to be monitored.

The switching devices 2, 5 and the analog-to-digital converter 6 are controlled by a control unit 9, which receives its control commands from the computer 7, thus the computer 7 is in effect the synchronizer of the system.

Since all control commands come from the computer 7, the evaluation can be performed so that during transient times a few sample values of the analog-to-digital converter may be discarded.

This monitoring facility can be used with special advantage to monitor the conventional instrument-landing system (ILS). There the signals extracted from a near-field monitoring dipole, from an integral network, and from the transmitter may be monitored. The signal extracted from the transmitter is considerably larger than the two other signals; in the arrangement shown in the single drawing, it can be used to advantage as the signal $S_{III}$.

If several signals are to be monitored, the switching devices may be correspondingly expanded. As mentioned previously, the computer 7 controls the programming of switching devices and thus determines which signal is to be monitored. The monitoring is thus performed using time-division multiplexing. It is also possible to adjust the gain of the amplifier 3 differently for the individual signals to be monitored. It suffices to pass the signal $S_{II}$ through the amplifier at intervals of 0.01 seconds, because the gain determining parameters of the amplifier change more slowly.

If the monitoring facility is used in an ILS installation, the analog-to-digital converter is advantageously preceded by a low-pass filter to remove any undesirable frequency components (e.g., speech signals above the 960-Hz sampling frequency of the analog-to-digital converter). The evaluation of the signals to be monitored is preferably performed in the computer employing a Fourier analysis.

The computer provides the result of the monitoring operation in digital form.

What is claimed is:

1. Apparatus for monitoring the level of a radio-frequency signal, particularly for monitoring the signals radiated by navigation systems, wherein the signal to be monitored is amplified in an amplifier before being passed on to an evaluating device, comprising:
    first switching device which, depending on its switch position, passes either said radio-frequency signal to be monitored or a second relatively constant radio-frequency signal to said amplifier;
    means deriving said second signal comprising an attenuator responsive to a third radio-frequency signal whose level is considerably higher and relatively constant, vis-a-vis that of the signal to be monitored;
    means directing the amplified signal to an evaluating device by a first path, while said third signal reaches said evaluating device by a second path; and
    means within said evaluating device for determining and comparing the levels of the amplified second signal and the third signal, and generating a signal to regulate the gain of said amplifier so that a desired value is reached if the level ratio of the second to third signals deviates from said desired value.

2. Apparatus according to claim 1 in which said first path and said second path include separate demodulators.

3. Apparatus according to claim 2 in which means are included whereby the output signals of said demodulators are digitized, and said evaluating device is a digital computer.

4. Apparatus as claimed in claim 3, further comprising an additional switching device which passes said signals from said first or second path to an analog-to-digital converter under control of said computer, said computer storing respective determined values for comparison.

5. Apparatus for monitoring the level of a radio-frequency signal wherein the signal to be monitored is of a level requiring pre-detection amplification, comprising:
    a variable gain amplifier with a gain controllable in response to a control signal;
    first and second signal inputs responsive to low and high levels input signals, respectively;
    an attenuator responsive at its input to said second signal input for providing a fractional signal at its output which is a predetermined fraction of said high level input signal;
    a first controllable switch device for alternatively connecting one of said fractional signal and said low level signal from said first signal input to the input of said amplifier in response to a first switching control signal;
    first and second demodulators respectively connected to the output of said amplifier and to said second signal input, respectively;
    an analog-to-digital converter;
    a second controllable switch device for alternately connecting the output of one of said first and second demodulators to said analog-to-digital converter in response to a second switching control signal;
    computer means for evaluating the digital output of said analog-to-digital converter to generate digital output signals representative of predetermined parameters of the signals encoded by said analog-to-digital converter; and
    a control unit responsive to programmed signals from said computer to generate said first and second switching control signals.

6. The apparatus according to claim 5 in which said computer includes circuits for comparing the two signals connected to its input by said second switching device.

7. Apparatus according to claim 5 in which said computer provides an output value offset compensating for the differences between the signals, in which said signals are alternately connected to said analog-to-digital converter.

* * * * *